Aug. 20, 1929.  E. W. DAVIS  1,725,257
LUBRICANT COMPRESSOR
Filed April 25, 1924

Inventor:
Ernest W. Davis.
By Earl X Pierce
Atty.

Patented Aug. 20, 1929.

1,725,257

UNITED STATES PATENT OFFICE.

ERNEST W. DAVIS, OF OAK PARK, ILLINOIS, ASSIGNOR TO ALEMITE CORPORATION, OF CHICAGO, ILLINOIS, A CORPORATION OF DELAWARE.

LUBRICANT COMPRESSOR.

Application filed April 25, 1924. Serial No. 708,932.

My invention relates to improvements in lubricant compressors, and is particularly concerned with improvements in that type of lubricant compressor which is used for supplying lubricant under high pressure to the bearings to be lubricated. Such compressor usually forms part of a system comprising a plurality of fittings, one of which is secured to each of the bearings to be lubricated, and a compressor comprising means for placing a lubricant therein under high pressure, and means for effecting a sealed connection with each of the fittings which is to receive the lubricant.

The objects of my present invention are:

First: To provide a compressor of the character described including a barrel, or low pressure cylinder or chamber, and a high pressure cylinder communicating therewith, the high pressure cylinder having means therein for discharging the lubricant therefrom under high pressure;

Second: To provide a lubricant compressor of the character described, in which the barrel, or low pressure cylinder or chamber, is provided with means for insuring the discharge of lubricant from the barrel or low pressure cylinder to the high pressure cylinder;

Third: To provide a compressor, such as described, in which the means for insuring the discharge of lubricant from the barrel to the high pressure cylinder includes a piston or follower;

Fourth: To provide a lubricant compressor of the character described, in which the piston or follower is urged against the lubricant by means of a spring which can be periodically tensioned so that it will be effective in discharging a considerable quantity of lubricant from the barrel before it is necessary again to tension the spring, and Fifth: To provide a compressor of the character described, which is simple in construction, economical to manufacture, and easy to operate.

Figure 1:
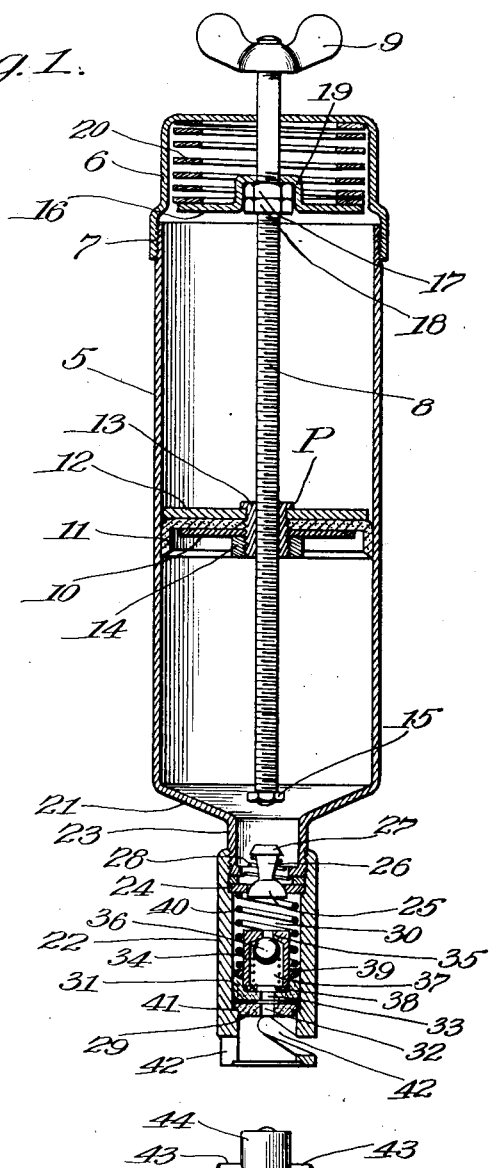
Figure 2:
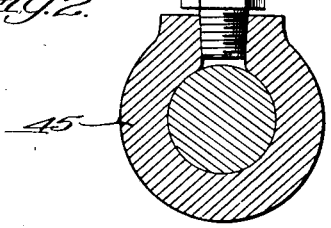

Other objects of my invention will appear as this description progresses, reference being had to the accompanying drawings, in which Figure 1 is a central longitudinal section through a compressor embodying my invention, and Figure 2 is a view showing in side elevation one of the fittings adapted to coact with the compressor illustrated in Figure 1.

Referring to the drawings, my improved compressor comprises the low pressure barrel or cylinder 5, which is provided with an elongated cap 6 removably connected with the open end of the barrel 5 by means of the screw threaded connection 7.

The threaded piston rod 8 is slidably mounted in the cap 6, and provided at its outer end with a wing nut 9, or any other suitable handle, whereby it can be rotated. The major portion of this piston rod is screw threaded, as shown in the drawing. I prefer to make the thread of this piston rod a left handed one, although it will work equally well with a right handed thread.

A piston comprising the face plate 10, the cup leather 11, the follower plate 12, and the nut 13, threaded upon the piston rod 8, is slidably or reciprocably mounted in the barrel 5. A second nut 14 threaded upon the inner end of the nut 13 provides means for clamping the face plate and the follower plate upon opposite sides of the cup leather, and thereby holds the piston in assembled relation. A nut or collar 15, secured to the inner end of the piston rod 8, provides means for engaging the piston just described and withdrawing it from the barrel 5 when it is desired to refill the latter.

A disc or plate 16 is slidably mounted upon that portion of the piston rod 8 which lies within the cap 6, and is free to slide or reciprocate upon the piston rod. A nut 17, which is locked in position by means of the lock nut 18, provides means for limiting the inward movement of the plate 16 relatively to the piston rod 8. Preferably, the plate 16 is provided with a cup-shaped depression 19 for receiving these nuts so as to permit the follower plate 12 to be brought substantially into contact with the plate or disc 16, and thereby economize the space in the compressor. A compression spring 20, confined between the plate 16 and the end of the cap 6, provides means for yieldingly urging the piston rod in an inward direction.

From the proceding description, it will be apparent that when the thumb nut or handle 9 is rotated in the proper direction, the piston threaded thereon will be moved into contact with the lubricant confined between it and the end 21 of the compressor, and that thereafter, continued rotation of the handle 9 will cause the piston rod 8 to move outwardly, and thereby place the spring 20 under tension. In this manner, the piston P will be urged against the lubricant in the barrel 5 under the tension of the spring 20.

While any desired means may be used for receiving the lubricant from the barrel 5 and discharging it into the bearings under increased pressure, I prefer to make use of the sleeve 22, which is threaded onto the tubular extension 23 of the end closure 21, and which forms a high pressure cylinder. A perforated disc 24, clamped between the end of the tubular extension 23 and the sleeve 22, provides a seat for the valve 25, the stem 26 of which projects through the opening in the disc 24 and terminates in a head 27. A spiral spring 28, confined between the head 27 and the disc 24, provides means for yieldingly holding the valve 25 in its closed position. A leather washer or gasket 29 is reciprocably mounted in the bore 30 of the cylinder 22, and backed by the cup leather 31. The gasket and cup leather are provided with registering openings 32 and 33, respectively, for the passage of lubricant. A tubular displacing element 34 has its outer end positioned within the cup leather 31. Its inner end is flanged over as shown at 35 to provide a seat for the closure 36, which is held in place by means of the compression spring 37 confined between it and the inturned flange 38, at the outer end of the tubular member 34. A beveled ring 39 surrounds the displacing member 34 and bears against the inner edge of the cup leather 31. A compression spring 40 is confined between the disc 24 and the ring 39, and provides means for yieldingly urging the piston construction, formed by the elements just described, outwardly against the shoulder 41, as shown in Figure 1.

The outer end of the sleeve or cylinder 22 is provided with a pair of oppositely disposed cam slots 42 for receiving the ends 43 of the pin, which extends through the fitting 44 which is here shown attached to a bearing 45. The construction of this fitting is well known to those skilled in this art, and further explanation thereof appears to be unnecessary.

When the end of the cylinder 22 is placed over the end of the fitting 44 and rotated, the cam slots 42 receive the ends 43 of the pin of the fitting, and at the same time the end of the fitting contacts with the outer face of the gasket 29. Rotation of the barrel 5 in the proper direction causes the cylinder 22 to move down over the fitting 44, and the piston construction in the outer end of the cylinder 22 to move inwardly, thereby displacing the contents of the cylinder 22 outwardly through the openings 32 and 33 and into the fitting. Rotation of the barrel 5 in the opposite direction causes the piston construction referred to to move outwardly, and at the same time the valve 36 closes upon its seat, thereby preventing the entrance of air into the cylinder 22.

If the spring 20 has previously been placed under tension by rotating the piston rod 8 in the proper direction, just as soon as the piston construction in the high pressure cylinder 22 starts to move forwardly, the tension of this spring exerted upon the piston P will cause the latter to move forwardly, and discharge lubricant past the valve 25 into the high pressure cylinder 22. In this manner, the last mentioned cylinder is primed and made ready to discharge another quantity of lubricant into the fitting 44 when the direction of rotation of the barrel 5 is again reversed.

When the barrel 5 is substantially emptied, the operator unscrews the cap 6 and pulls outwardly upon the piston rod 8, thereby carrying with it the plunger P. The barrel 5 is then filled, in any desired manner, and the plunger P rotated upon the piston rod 8 until it contacts with the plate 16, whereupon the cap 6, piston rod 8, and plunger P are replaced, and the compressor is then again ready for use.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a barrel having an elongated removable cap, a threaded piston rod slidably mounted in said cap, a handle on the outer end of said piston rod, a piston threaded on said piston rod, a plate slidable on said piston rod and reciprocable in said cap, a stop carried by said piston rod and engaging said plate, a spring confined between said plate and said cap, a cylinder communicating with said barrel, and means in said cylinder, actuated by the rotation of said cylinder, for displacing lubricant from said cylinder.

2. A lubricant compressor comprising a barrel having an elongated removable cap, a threaded piston rod slidably mounted in said cap, a handle on the outer end of said piston rod, a piston threaded on said piston rod, a stop carried by said piston rod, a spring confined between said stop and said cap, a cylinder communicating with said barrel and rigid therewith, and means in said cylinder for displacing lubricant from said cylinder, said last named means being operable by said handle.

3. A compressor comprising a rigid body, low pressure compressing means and high pressure compressing means in said body, and a separate rotary drive for each compressing means, one drive operating by rotation of said body, and the other by rotating a single external handle.

4. A compressor comprising a rigid body, low pressure compressing means and high pressure compressing means in said body, and a separate rotary drive for each compressing means, one drive operating by rotation of said body, and the other by rotating a single external handle, both drives operating by rotation in the same direction.

In witness whereof, I hereunto subscribe my name this 18th day of April, 1924.

ERNEST W. DAVIS.